US007343622B1

(12) United States Patent
Woodall (10) Patent No.: US 7,343,622 B1
(45) Date of Patent: Mar. 11, 2008

(54) MULTI-LEVEL SECURE MULTI-PROCESSOR COMPUTER ARCHITECTURE

(75) Inventor: Thomas R. Woodall, Valencia, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 09/560,301

(22) Filed: Apr. 27, 2000

(51) Int. Cl.
*H04L 9/32* (2006.01)
(52) U.S. Cl. ............. 726/3; 726/4; 726/9; 726/17; 714/733; 702/118
(58) Field of Classification Search ............. 370/200, 370/352, 354, 355, 357, 350, 360, 362, 398, 370/231, 256; 713/207, 201; 726/1–4, 13, 726/9, 17; 384/441; 709/238, 240, 242, 709/223; 705/64; 714/733; 702/118
See application file for complete search history.

(56) References Cited

U.S. PATENT DOCUMENTS

| | | | | |
|---|---|---|---|---|
| 4,608,684 A * | 8/1986 | Upp | | 370/368 |
| 4,958,341 A * | 9/1990 | Hemmady et al. | | 370/352 |
| 5,280,529 A * | 1/1994 | Nost | | 713/153 |
| 5,519,704 A * | 5/1996 | Farinacci et al. | | 370/402 |
| 5,842,040 A * | 11/1998 | Hughes et al. | | 710/11 |
| 6,088,770 A * | 7/2000 | Tarui et al. | | 711/148 |
| 6,108,787 A * | 8/2000 | Anderson et al. | | 713/201 |
| 6,188,698 B1 * | 2/2001 | Galand et al. | | 370/412 |
| 6,271,946 B1 * | 8/2001 | Chang et al. | | 398/79 |
| 6,400,713 B1 * | 6/2002 | Thomas et al. | | 370/355 |
| 6,457,051 B1 * | 9/2002 | Riddle et al. | | 709/224 |
| 6,574,221 B1 * | 6/2003 | Petersen | | 370/395.1 |
| 6,597,692 B1 * | 7/2003 | Venkitakrishnan | | 370/380 |
| 6,600,744 B1 * | 7/2003 | Carr et al. | | 370/392 |
| 6,625,650 B2 * | 9/2003 | Stelliga | | 709/226 |

OTHER PUBLICATIONS

Shared Resource Management For Integrated Avionics Systems; Greg McIntire; Texas Instruments Incoporated, Plano, Texas; 0-7803-2425-0/94—1994 IEEE; p. 626-629.*

* cited by examiner

*Primary Examiner*—T. B. Truong
(74) *Attorney, Agent, or Firm*—Leonard A. Alkov (57) ABSTRACT

A multi-level secure multi-processor computer architecture. The inventive architecture provides an inexpensive security solution for integrated avionics and includes a plurality of nodes. The nodes are connected via a switch in a network configuration over which data is routed using labels. The switch is controlled to facilitate secure communication of data between the nodes. In the illustrative embodiment, the network is a Fibre Channel network including plural switches in which a system manager node serves to control routing between nodes based on a security policy. Each node has a central processing unit. The system manager is implemented as a node and sets up routing tables for selective connection of the nodes via the switch. The label assignments are stored in Fibre Channel network interface cards disposed on each node. The system manager also sets up label routing tables that authorize the interconnection of selective nodes. The label routing tables are stored in the switch, which in the illustrative implementation is a crossbar switch having a plurality of switch protocol controllers and switch control units. The label assignments and label routing tables are stored in a label authorization table stored in the system manager. After a secure startup, the system allows for communication in accordance with a security policy between nodes to which trusted and/or untrusted hardware is connected and running under trusted and/or untrusted software applications. The software applications may run on commercial off-the-shelf (COTS) operating systems.

15 Claims, 5 Drawing Sheets

| LABEL | EN | ADDR |
|-------|-----|------|
| 0 | NO | |
| 1 | YES | FFOE |
| ... | NO | |
| 4095 | NO | |

*FIG. 4* — 120

| LABEL | PORT |
|-------|------|
| 0 | 0000000000000000 |
| 1 | 0000001000000000 |
| ... | 0000000000000000 |
| 4095 | 0000000000000000 |

*FIG. 5* — 130

LABEL AUTHORIZATION TABLE

| LABEL | SENDERS | RCVRS | CLASS | RETRY |
|-------|---------|-------|-------|-------|
| 10 | FE1 | FE2 | 1 | YES |
| 11 | FE3, FE4 | FE5 | 1 | YES |
| ... | | | | |
| 8924 | FE7 | FE1, FE2 | 1 | NO |

*FIG. 6* — 140

MULTI-LEVEL SECURE MULTI-PROCESSOR COMPUTER ARCHITECTURE

This invention was made with Government support under Contract N00019-97-C-0037 with the Department of the Navy. The government has certain rights in this invention.

BACKGROUND OF THE INVENTION

1. Field of the Invention

The present invention relates to computer architectures. More specifically, the present invention relates to multi-processor computer architectures.

2. Description of the Related Art

The avionics of conventional military and commercial systems is such that multiple embedded systems, i.e., radar, electronics, electro-optical and etc, are 'stove-piped' in a cockpit. That is, each of these systems is implemented with a separate display. A need has been recognized to integrate the various systems together and, to the extent possible, provide an output through a single display.

However, integrated avionics will require the use of an integrated multi-processor computer architecture. This is problematic from a security standpoint as certain systems currently have lower security classification levels than others. Hence, communication between such systems may be forbidden.

The need for a trusted operating system kernel has forced prior approaches to use a custom multi-level secure operating system. However, this approach is viewed as extremely expensive. Hence, a need remains in the art for an inexpensive security solution for integrated avionics.

SUMMARY OF THE INVENTION

The need in the art is addressed by the multi-level secure multi-processor computer architecture of the present invention. The inventive architecture includes a plurality of nodes connected via a switch in a network configuration over which data is routed using labels. In accordance with the present teachings, the switch is controlled to facilitate secure communication of data between the nodes.

In the illustrative embodiment, the network is a Fibre Channel network including plural switches in which a system manager node serves to control routing between nodes based on a security classification level. Each node has a central processing unit. The system manager is implemented as a node and sets up routing tables for selective connection of the nodes via the switch. The label assignments are stored in fibre channel network interface cards disposed on each node. The system manager also sets up label routing tables, which authorized the interconnection of selective nodes. The label routing tables are stored in the switch, which in the illustrative implementation is a crossbar switch having a plurality of switch protocol controllers and switch control units. The label assignments and label routing tables are stored in a label authorization table stored in the system manager. Communication between processors is via labeled messages. A labeled message is a unit of data identified by a label. The label indicates the contents of the message. A message can be a Fibre Channel frame, sequence or exchange. A label is any type of unique identifier, e.g., whole number.

After a secure startup, the system allows for communication in accordance with a security policy between nodes to which trusted and/or untrusted hardware is connected and running under trusted and/or untrusted software applications. The software applications may run on commercial off-the-shelf (COTS) operating systems. Hence, the present invention provides an inexpensive security solution for integrated avionics.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
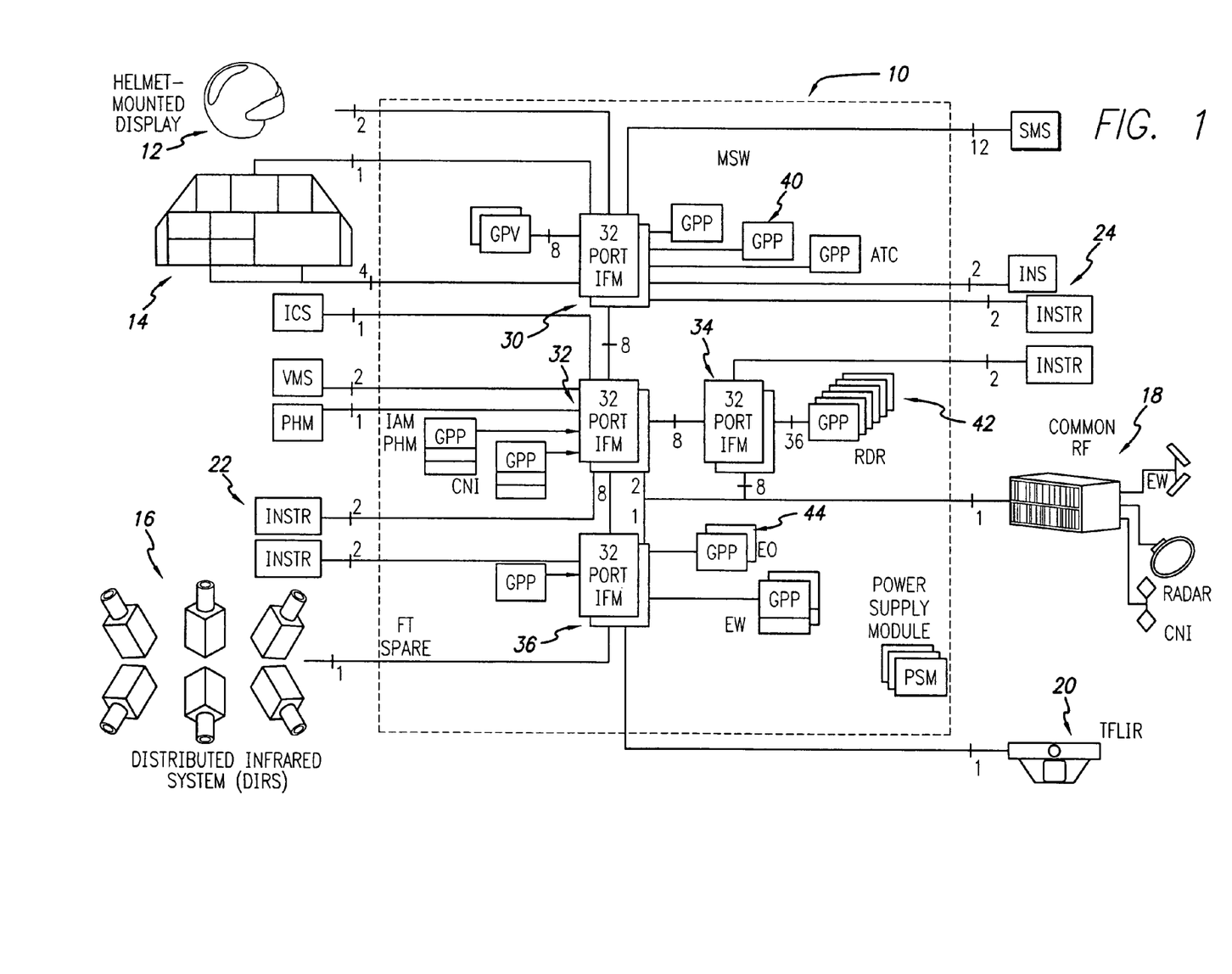
FIG. 1 is a block diagram of a multi-level secure multi-processor computer architecture implemented in accordance with the teachings of the present invention.

FIG. 1 is a block diagram of a multi-level secure multi-processor computer architecture implemented in accordance with the teachings of the present invention. The system 10 is adapted to be used with a helmet-mounted display 12, a cockpit display 14, a distributed infrared system 16, a common radio frequency (RF) subsystem 18, a forward looking infrared unit 20 and numerous other avionics devices. The system 10 includes plural interconnect fabric modules (IFMs) of which four are shown 30, 32, 34, and 36. As discussed more fully below, in the illustrative embodiment, the IFMs are crossbar switches and facilitate the interconnection of the numerous devices depicted in FIG. 1 under the control of several individual general purpose computers 40, 42 and 44 by way of example.

Figure 2:
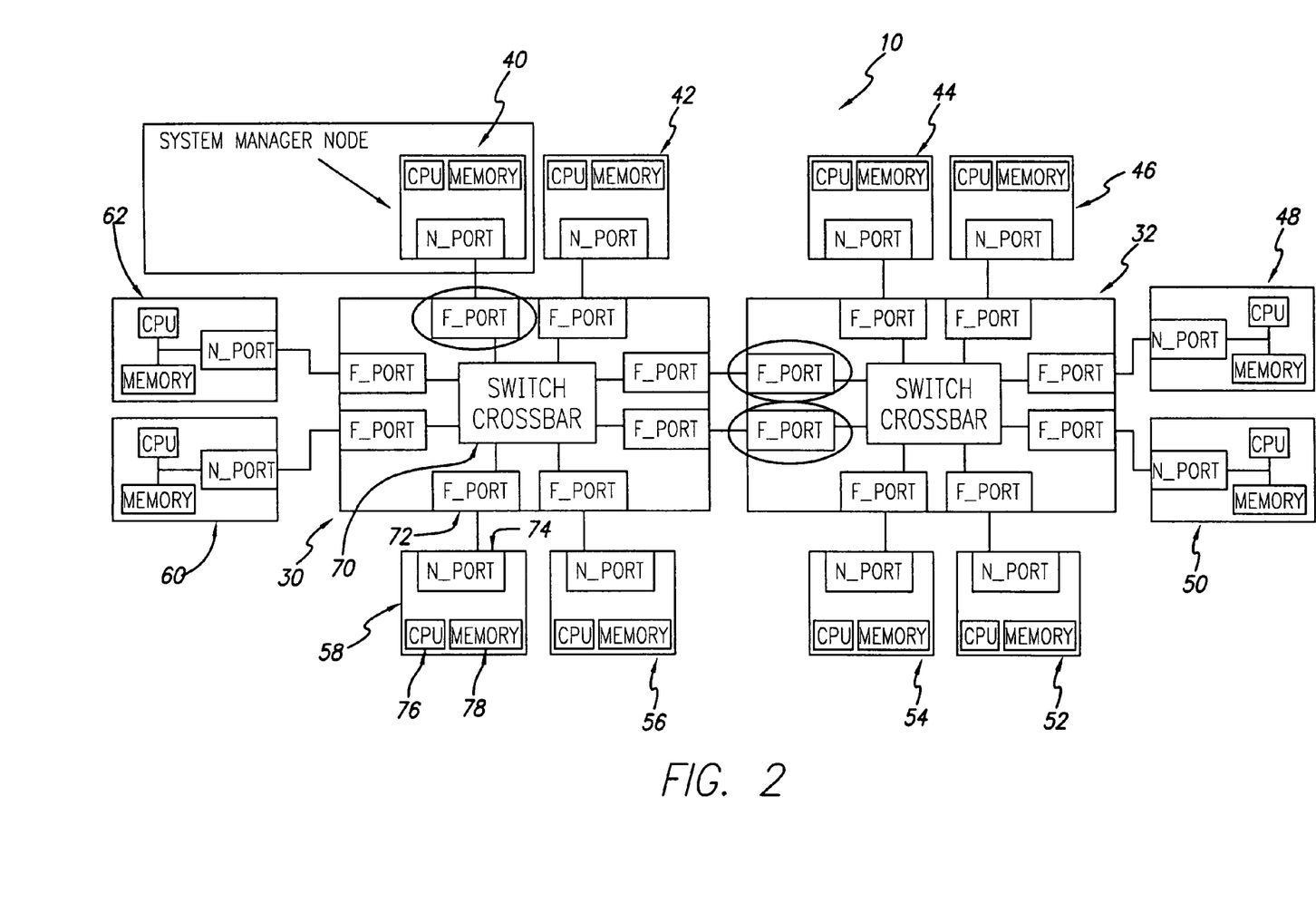
FIG. 2 is a simplified block diagram of a multi-level secure multi-processor computer implemented in accordance with the architecture of the present invention.

FIG. 2 is a simplified block diagram of a multi-level secure multi-processor computer implemented in accordance with the architecture of the present invention. As depicted in FIG. 2, in the preferred embodiment, the system 10 is implemented with a numerous nodes 40-62 (even numbers only) interconnected by plural interconnect fabric modules of which two are shown 30 and 32 in FIG. 2. Each interconnect fabric module includes a crossbar switch 70 which communicates with the nodes via a plurality of F_Ports 72. Each node includes a corresponding N_Port 74, which communicates with the F_Port of the associated IFM. Each node includes a plurality of functional elements including a central processing unit 76 and a memory 78. As discussed more fully below, one node 40 serves as a system manager node.

Basic Switch Behavior

When a message is received by the F_Port in the switch, the header in the first frame will contain the message label in a Destination ID (D_ID) field. The label is actually an alias. The switch will use this alias to do a table lookup to determine what port(s) the message will be sent to. Each F_Port has its own label table. Transfers of messages are consistent with the FC class of service. If the label is a well-known label, then the message is to be consumed by the switch if the F_Port that received the message is a designated fabric controller port. Messages that use well-known labels contain control information for the fabric controller. Control information includes information to:

initialize the switch
set up the label table
designate fabric controller ports

Any switch F_Port can be a fabric controller port. The switch has an alias entry for all labels. At initialization all F_Ports will be fabric controller ports.

N_Port Behavior

The N_Port sends only one message per connection, if a connection based FC class of service is used. It will only send messages on connections it initiates. The N_Port has the responsibility to guarantee successful delivery to the recipient(s) of the message. The N_Port provides no status to the processor except success or failure with no explanation.

Establishing a Secure State

In order for a multi-level secure system to be secure, it must establish a secure state. Once a secure state is established, untrusted software can be loaded and can use the system and will not have the ability to get the system out of its secure mode.

Startup

As discussed more fully below, each processing node boots up with a COTS OS and FC I/O driver. One node additionally boots up with the System Manager. The System Manager zeroes out all label tables, thus prohibiting any communication in the system. The System Manager will discover the network topology and assure it is acceptable. The System Manager assigns fabric controller nodes. It assigns the F_Port(s) that its N_Port(s) is(are) connected to as the fabric controller(s) for that switch. The System Manager selects at least one F_Port on every other switch to be a fabric controller port such that a chosen F_Port connects to another F_Port. All other F_Ports are disabled as fabric controller ports.

FIG. 2 shows an example of how fabric controller ports can be chosen as the fabric controller ports are circled in the figure. The System Manager sets up the label tables to allow it to communicate with the fabric controller ports. At this point only the System Manager can communicate with the fabric controller ports. Later, when applications are loaded they cannot communicate to fabric controller ports because, even if they knew the label(s), no routing is set up to allow them to so communicate. This is a necessary capability of the network, i.e., it has to be such that the System Manager can set it up such that it alone can control the routing of messages even if programs know how and have access to the network. Furthermore, routing of the messages must be done based on an identifier, e.g. a label. These network prerequisites enable the System Manager to establish a secure state.

Now the System Manager will establish communication with each FC I/O Driver individually. Since the System Manager knows the topology of the system, it will set the label tables to allow a route of a default message that the driver is waiting for. The System Manager does this for one N_Port at a time and disables the route for the default label once the FC I/O driver sends it a response using the unique send label. The System Manager uses the default message to inform the driver of a unique label it will use to send messages to the System Manager and a unique label the System Manager will reply on. The System Manager will enable only that N_Port to forward the send label. The reply label will be routed such that only the intended N-Port can receive the reply. The System Manager will use the unique send label to authenticate the sender. Note that if another node knew the unique label used by another node, it could not spoof that node by using its label since the F_Port attached to it's N_Port has not been enabled by System Manager to forward messages that use that label. Similarly, it could try to receive responses meant for another node, but those responses will never be routed to the F_Port connected to its N_Port.

Software Program Loading

Once the System Manager has established communication with all the drivers, applications can now be loaded by the System Manager. The FC I/O driver supports the System Manager in the load and program activation process. Once the programs are activated they will run. The programs are not trusted—and could even be malicious. From a security perspective, each node runs at a single classification level.

Program Operation

In the course of time, a program on one node may wish to send or receive messages from other nodes in the system. In order for a node to send messages, it must request permission from the System Manager. It does so via the FC I/O driver, which sends a message to the System Manager. When the System Manager receives such a request, it will check to see if the request is allowed by the System Security Policy. (This implementation is not specific to any security policy.) Note that the System Manager has authenticated the requesting node (i.e., it knows who is making the request) and knows the classification of all nodes based on how the system was loaded. If the request is allowed and there are receivers who have requested the message, then the System Manager will set up the network to route the message from the sender to any and all authorized receivers. If there are no receivers, then the System Manager will wait until there are to set up the label tables to route the message. The send requester will have no knowledge of whether a receiver exists. Note that if a sender attempted to bypass the System Manager and just send out a message, it would never be routed from the F_Port attached to the N_Port to any other port in the system because the System Manager would not have set up the F_Port to forward the message to any other port in the System. Thus no node could receive the message.

In order for a node to receive messages, it must request permission from the System Manager. It does so via the FC I/O driver, which sends a message to the System Manager. When the System Manager receives such a request, it will check to see if the request is allowed by the System Security Policy. If it is allowed and there is/are a sender(s) who have requested the message, then the System Manager will set up the network to route the message from the sender(s) to the newly enabled receiver. If there are no senders, then the System Manager will wait until there are to set up the label tables to route the message. The receive requester will have no knowledge of whether a sender exists. Note that if a receiver attempted to bypass the System Manager and just receive a message, the desired message would never be routed to the F_Port attached to the N_Port from any other port in the system because the System Manager would not have set up any F_Port to forward the message to that F_Port in the System. Thus no node can receive a message that is not intended for it.

Note that a node only has to make a send or receive request once. Once a corresponding set of send and receive requests have been received for a given message, the route will have been set up and the message can be sent without any intervening software control. This permits efficient operation of the system.

As described above, a given node can communicate with other nodes only as allowed by the System Manager per the System Security Policy. The security of the system does not rely on the COTS OS. As shown, a program could totally circumvent the COTS OS and yet can only communicate in the system as allowed by the System Manager. Since the System Manager knows what messages are being used by each node, it can monitor the messages to be sure the size and frequency of the messages are within requested limits. Note that the COTS OS is assumed to be benign since it can be purchased shrink-wrapped off-the-shelf.

The disclosure up to this point distinguishes between N_Ports and F_Ports to be consistent with Fibre Channel terminology, to simplify the explanation of this approach, and to be relevant to available network technology. Both N_Ports and F_Ports are network components and as such, if the N_Port could be controlled consistent with the prerequisite network capabilities (i.e., Controllable only by the System Manager, and identifier routing of messages), then the system could be constructed of only N_Ports, such as in a Fibre Channel Arbitrated Loop. Unfortunately, most N_Port implementations do not currently support the prerequisite network capabilities, although many switches do. In any event, those skilled in the art will appreciate that the present teachings are not Fibre Channel specific or dependent on network topology, but rather the capabilities of the network components used to build the system.

Detailed Design and Operation

Figure 3:
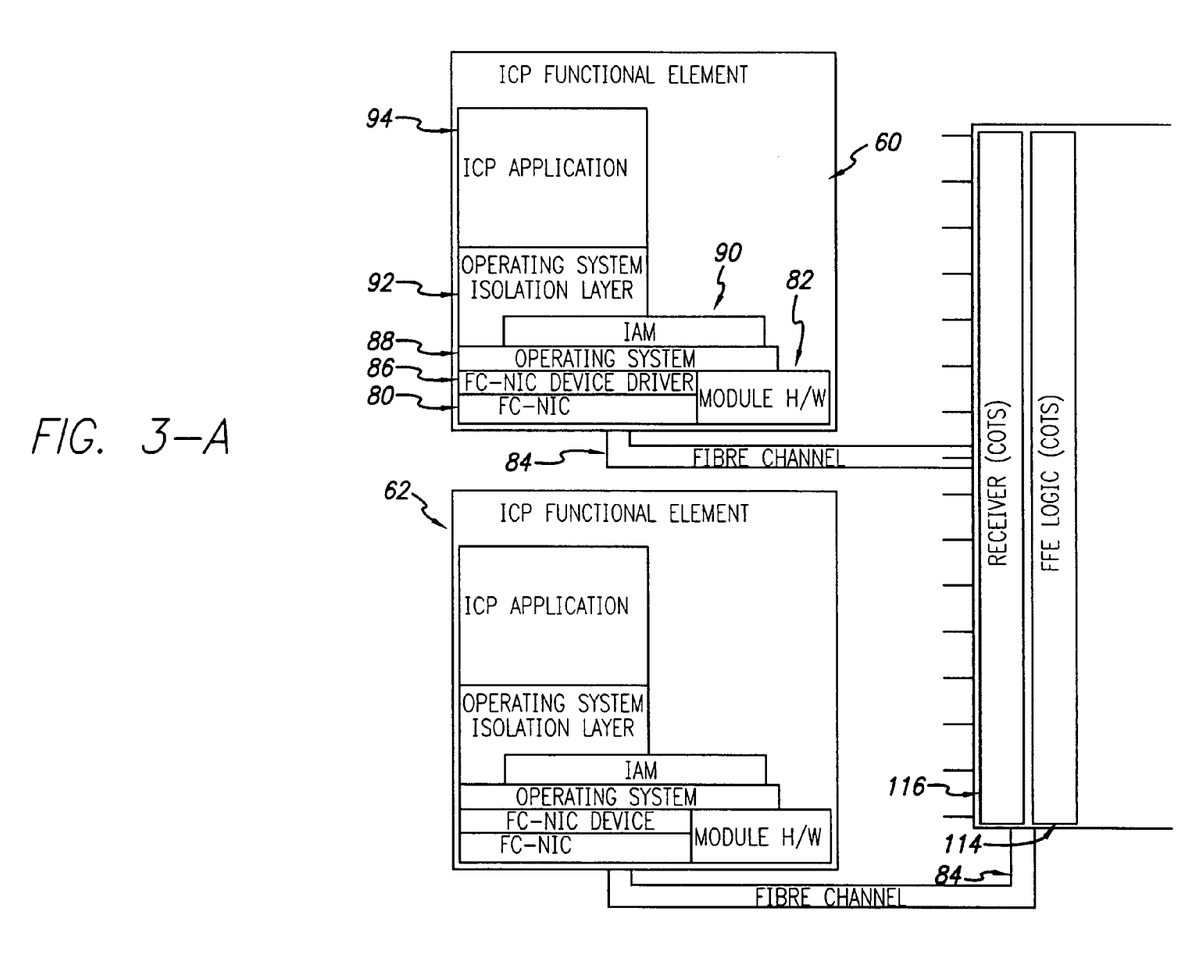
FIG. 3 is a simplified block diagram showing the architecture of the system manager node, a single interconnect fabric module and the nodes of the multi-level secure multi-processor computer of the present invention in greater detail.

FIG. 3 is a simplified block diagram showing the architecture of the system manager node, a single interconnect fabric module and the nodes of the multi-level secure multi-processor computer of the present invention in greater detail. The nodes 40, 60 and 62 are similar in design and construction. In the illustrative embodiment, some of the nodes are implemented as general purpose processing units and others are adapted to interface with specific devices. Accordingly, for the purpose of illustration, a single node is described in detail with the understanding that the other nodes are of essentially identical design or readily modified by one of ordinary skill in the art to suit the requirements of a particular application.

In the illustrative embodiment, each node 40, 60, and 62 includes a fibre channel network interface card (FC_NIC) 80 and a hardware module 82. The fibre channel network interface card 80 is a commercial off-the-shelf interface card configured in compliance with the Fibre Channel ANSI standard as discussed above. Fibre channel interface cards may be purchased from such vendors as Systran, Q-Logic. The hardware module 82 includes the CPU 76 and memory 78 (FIG. 2). The CPU 76, memory 78 and interface card 80 are interconnected via a PCI bus (not shown) or other standard electrical bus as is common practice in the art. The nodes 60 and 62 are the functional elements and further include an FC_NIC device driver 86, an operating system 88, an Integrated Avionics Manager (IAM) agent 90, an operating system isolation layer 92 and an Integrated Core Processor (ICP) application layer 94. The communication with the (IAM) Manager is facilitated by the (IAM) Agent using the FC I/O Driver. The network driver is the sum of the COTS FC I/O driver plus part of the (IAM) Agent.

In the illustrative embodiment, the system 10 is implemented in accordance with the Fibre Channel network standard and runs a VxWorks operating system from Wind River Systems. Those skilled in the art will appreciate that the invention is not limited to use in accordance with the Fibre Channel network standard. The teachings of the present invention may be designed in compliance with other standards without departing from the scope of the present teachings. Nor is the invention limited to use with any particular operating system. Indeed, as discussed more fully below, a feature of the present invention is that it provides a multi-level secure multi-processor architecture, which allows for the use of commercial off-the-shelf operating systems.

The system manager node 40 further includes an Integrated Avionics Manager (IAM) 96, which is implemented, in the preferred embodiment, in software. Although only one IFM 30 shown in FIG. 3, in the illustrative embodiment, the system manager node 40 is connected to the other nodes in the system via plural interconnect fabric modules 30-36 (even numbers only) by way of a Fibre channel network 84.

The IFMs 30 include a COTS transmitter and receiver 100 and 116, COTS FFE logic 102 and 114, a plurality of switch protocol controllers (SPCs) 104 and trusted dual redundant COTS crossbar switches 110 and 112 operating under control of first and second switch control units (SCUs) 106 and 108, respectively. The SPCs and SCUs are of conventional design and construction.

Those skilled in the art will appreciate that the system 10 is a unified network implemented, in the preferred embodiment, with Fibre Channel. Communication between processors is via labeled messages. A labeled message is a unit of data identified by a label. The label indicates the contents of the message. A message can be a Fibre Channel frame, sequence or exchange. A label is any type of unique identifier, e.g., whole number.

System secure requires startup in a secure state and the maintenance of that secure state thereafter. As discussed more fully below, before startup, each node consists of hardware and non-volatile software. On startup, each the CPU 76 at each node executes built-in-test (SBIT) routines from read-only memory (ROM) on each functional element including the COTS operating system, trusted drivers and the IAM agent. Next, the IAM Agents 90 of each node will arbitrate with each other through the IFMs and the winner will be the system manager node 40.

The system manager node 40 (plus a backup) will load and start the IAM Manager 96. At this point, the IAM Agents 90 for each node will continually attempt to register with IAM Manager until they are successful. They will fail until IAM Manager 96 initializes the network. The IAM Manager 96 of the system manager node 40 will now discover the system by probing each port in the system through all IFMs. At the conclusion the IAM Manager 96 will know the network topology and compare it to an expected (stored) topology. The IAM Manager 96 will now configure the system by setting the Fabric Controller Ports 72 (not connected to application NICs) and setting the IFM routing tables (discussed more fully below) to allow only the IAM Manager 96 to communicate with the Fabric Controller Ports. This locks out all other functional elements as they have no way to route messages to the Fabric Controller. Fabric Controller ports accept messages using well-known labels.

The IAM Manager 96 will now configure the network such that the IAM Agents 90 can register with the IAM Manager 96. It does this by setting label routing tables in the switch protocol controllers 104 of the IFMs 30 and label table entries in the IAM Manager's network interface card 80.

Figure 4:
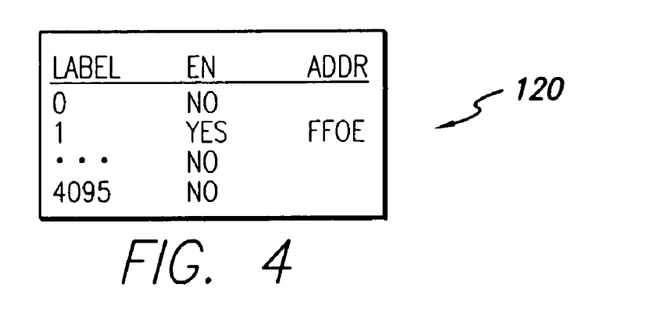
FIG. 4 shows an exemplary label table set up by the illustrative multi-level secure multi-processor computer implemented in accordance with the architecture of the present invention.
Figure 5:
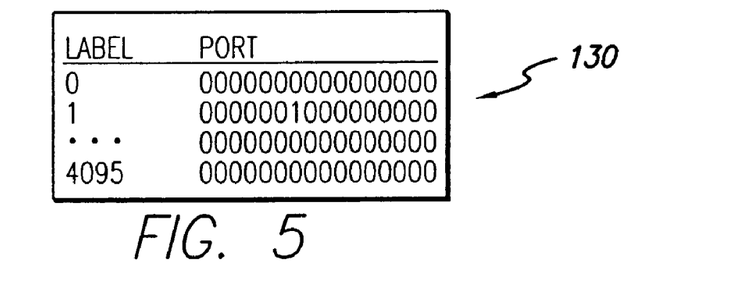
FIG. 5 shows an exemplary label routing table set up by the illustrative multi-level secure multi-processor computer implemented in accordance with the architecture of the present invention.

FIG. 4 shows an exemplary label table 120 and FIG. 5 shows an exemplary label routing table 130.

The Fabric Controller ports are now under secure control by IAM Manager. No other nodes can get a route to the fabric controller without first accessing the fabric controller, as only IAM Manager 96 of the system manager node 40 can set those routes.

In accordance with the teachings of the present invention, when the IAM Manager 96 receives a registration message from IAM Agent 90, it will allocate unique labels for communication with that IAM Agent. It will set the routing tables and each IAM Agent component will set its FC-NIC Label Table Entries based on the reply from LAM Manager 96. The IAM Manager 96 can authenticate the IAM Agent using these labels. Even if another program tried to use these labels they would never be routed to IAM Manager.

Once IAM Manager 96 has finished configuring the network to allow IAM Agent communication, it will wait a finite period of time adequate for all IAM Agents 90 to register. At this point it can determine the health of the system 10. It will compare the determined configuration and health versus the expected values.

Secure startup is now complete. Applications can now be loaded and activated.

(Note that once an untrusted application is loaded and activated, all software on the FE is untrusted. However, the FE can communicate only as the IAM Manager 96 has authorized in the Label Routing Tables.)

Now that a secure startup has been effected, the following discloses how to maintain a secure state. As the applications initialize, they request communication with other programs from the IAM Agent 90. Transparent to the application these translate to 'Connect to Send' and 'Connect to Receive' requests. These are forwarded to the IAM Manager 96 using the labels set up during initialization. When the LAM Manager 96 receives a 'Connect to Send' or 'Connect to Receive' request, it will check this request against an authorization table in the IAM Manager built during System Build.

Figure 6:
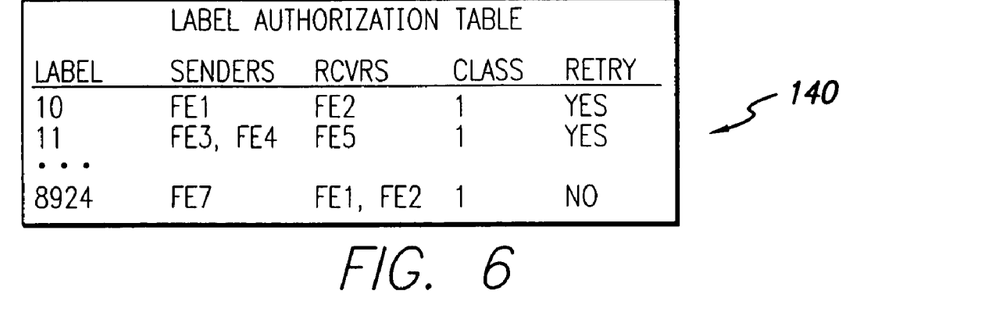
FIG. 6 is an exemplary label authorization table set up by the illustrative multi-level secure multi-processor computer implemented in accordance with the architecture of the present invention.

FIG. 6 is an exemplary label authorization table 140 constructed in accordance with the teachings of the present invention.

If the message is authorized, the LAM Manager 96 will return Fibre Channel specific parameters back to the IAM Agent 90. The IAM Agent 90 uses these parameters when it calls the FC-NIC driver 86. The application is completely isolated from the Unified Network implementation. The application does not supply Fibre Channel specific information. This allows for another network type without any modification to the application. Also note that the application is in fact isolated from the security implementation, i.e., the application does not provide any security information, e.g., classification.

Once a message has at least one sender and one receiver, the IAM Manager 96 will set up the IFM 30 to properly route the message. However, the IAM Manager 96 first responds to the receivers and then sets the route—this guarantees that the FE is ready before a message is sent. After the route has been set, the next attempt to send a message will be routed. If an application attempted an unauthorized send or receive operation, it would have no affect because the IFM 30 would not route the message to/from the FE.

Those skilled in the art will appreciate that the system 10 has three key components that enable communication and security:

1. the IAM Manager 96 and its Label Authorization Table 140;

2. the Interconnect Fabric Module (IFM) Label Routing Tables 130; and 3. the Fibre Channel—Network Interface Card (FC_NIC) Label Tables 120.

In short, the system 10 starts up with only trusted IAM components running.

The IAM Manager assigns fabric controller ports on each IFM. All such ports are chosen to be ports dedicated to inter-IFM communication, i.e., the port is connected to another IFM. The only allowable exception is a port connected to an IAM Manager node.

The IAM Manager sets up all IFM ports in the system such that it is the only entity in the system with routing to the fabric controller nodes using the fabric controller labels.

The IAM Manager commands all IFM ports to operate in label mode. At this point the only nodes that can communicate with the fabric controller ports is(are) the IAM Manager node(s). This is because any non-IAM Manager node must have its communication routed by an IFM node to get to a fabric controller port that receives the fabric controller label. Therefore, even if a rouge application knew the fabric controller labels and knew how to operate the fabric controller, it could not communicate with the fabric controller because no route exists from its node to a fabric controller using the fabric controller label.

Untrusted applications can be loaded on any node except for the IAM Manager node(s). Once this is done, no node is trusted except IAM Manager node(s). No IAM Agent can be trusted except on nodes where only trusted software exists.

The IAM Manager setups up label tables as requested by applications provided such communications are permitted by the security policy. The security policy can be embodied in an access table generated during System Build.

If each IAM Agent communicated with IAM Manager using unique labels in each direction and since IAM Manager sets up said routing, then there could be no spoofing of other nodes.

The IFM provides a password for fabric controller communication. This 32-bit value is useful as an integrity check in case a system fault changes a label to a fabric controller label and accidentally routes a message to the fabric controller.

The FC-NICs should be enhanced to guarantee that data flows only in the direction specified. One approach would be to use only class 3 messages, i.e. data grams. (To do this the IFM or NIC would have to not support class 1 as without a Trusted OS, the application can request any class that is available.)

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A multi-level secure computer architecture comprising:
a plurality of nodes;
switch means for providing a connection between said nodes as part of a network over which data is routed using labels; and
means for controlling said switch means to facilitate secure communication of data between a first and a second of said nodes, said means for controlling including a system manager which controls the routing of said data, said means for controlling including means for controlling routing between nodes based on a security classification level wherein said system manager is an integrated avionics manager.

2. The invention of claim 1 wherein said network is a Fibre Channel network.

3. The invention of claim 1 wherein said system manager includes means for setting up routing tables for selective connection of said nodes.

4. The invention of claim 3 wherein said means for controlling includes means for creating and storing a label authorization table which determines routing between nodes.

5. The invention of claim 4 wherein said labels are stored at said nodes.

6. The invention of claim 5 wherein said table is stored on said switch means.

7. The invention of claim 6 wherein said label authorization table is stored on said system manager.

8. The invention of claim 1 wherein the means for controlling is a node.

9. The invention of claim 8 wherein each node includes a plurality of functional elements.

10. The invention of claim 9 wherein at least one functional element is a central processing unit.

11. The invention of claim 10 wherein each node includes a network interface card.

12. The invention of claim 11 wherein each node includes a fiber channel network interface card.

13. The invention of claim 11 wherein each node includes a hardware module.

14. The invention of claim 1 wherein said switch means includes a crossbar switch.

15. A multi-level secure multi-processor computer architecture comprising:
a plurality of nodes;
switch means for providing a connection between said nodes as part of a network over which data is routed using labels; and
means for controlling said switch means to facilitate secure communication of data between a first and a second of said nodes, said means for controlling including a system manager which controls the routing of said data, said system manager being an integrated avionics manager.

* * * * *